US009329432B2

(12) United States Patent
Ek et al.

(10) Patent No.: US 9,329,432 B2
(45) Date of Patent: May 3, 2016

(54) HIGH POWER EFFICIENCY LCD (71) Applicant: SONY CORPORATION, Tokyo (JP)

(72) Inventors: Martin Ek, Dalby (SE); Anders Linge, Kavlinge (SE)

(73) Assignee: Sony Corporation, Tokyo (JP)

( * ) Notice: Subject to any disclaimer, the term of this patent is extended or adjusted under 35 U.S.C. 154(b) by 88 days.

(21) Appl. No.: 13/976,176

(22) PCT Filed: Nov. 26, 2012

(86) PCT No.: PCT/IB2012/056743
§ 371 (c)(1),
(2) Date: Jun. 26, 2013

(87) PCT Pub. No.: WO2013/093672
PCT Pub. Date: Jun. 27, 2013

(65) Prior Publication Data
US 2014/0293186 A1 Oct. 2, 2014

Related U.S. Application Data (60) Provisional application No. 61/579,992, filed on Dec. 23, 2011.

(51) Int. Cl.
G02F 1/1335 (2006.01)
(52) U.S. Cl.
CPC ........ *G02F 1/1336* (2013.01); *G02F 1/133514* (2013.01); *G02F 1/133555* (2013.01); *G02F 1/133603* (2013.01); *G02F 2001/133521* (2013.01)
(58) Field of Classification Search
CPC ............ G02F 1/133555; G02F 1/1336; G02F 1/133514; G02F 1/133603
USPC ........................................................ 349/114
See application file for complete search history.

(56) References Cited

U.S. PATENT DOCUMENTS

| 6,771,334 B2* | 8/2004 | Kubota et al. ................. 349/106 |
| 2002/0171792 A1 | 11/2002 | Kubota et al. |
| 2007/0247573 A1 | 10/2007 | Ouderkirk et al. |
| 2008/0111958 A1 | 5/2008 | Kleverman et al. |

FOREIGN PATENT DOCUMENTS

JP 2003177236 A 6/2003

OTHER PUBLICATIONS

International Search Report and Written Opinion; Mar. 12, 2013; issued in International Patent Application No. PCT/IB2012/056743.
International Preliminary Report on Patentability; Jun. 24, 2014; issued in International Patent Application No. PCT/IB2012/056743.

* cited by examiner

*Primary Examiner* — James Dudek
(74) *Attorney, Agent, or Firm* — James C. Edwards; Moore & Van Allen PLLC

(57) ABSTRACT

The invention is directed to systems, methods and computer program products for increasing the power efficiency of a display. An exemplary system includes a transflective display that is operable in either a transmissive mode or a reflective mode, and an illumination source with one or more distinct peaks in the illumination source's transmission spectrum, wherein light from the illumination source is directed towards the transflective display during the transmissive mode of operation. For the transmissive mode of operation, the transflective display's transmission spectrum is configured to substantially match the illumination source's transmission spectrum such that one or more narrow passbands in the transflective display's transmission spectrum substantially overlap with the one or more distinct peaks in the illumination source's transmission spectrum. For the reflective mode of operation, the transflective display's reflection spectrum is substantially inversely related to the transflective display's transmission spectrum.

20 Claims, 8 Drawing Sheets

HIGH POWER EFFICIENCY LCD

BACKGROUND

Transmissive displays provide enhanced performance in many areas compared to transflective displays or purely reflective displays. A transmissive display is illuminated from the back by an illumination source/light source (e.g., a backlight), and is viewed from the opposite side (i.e., the "front"). This type of display may be used in applications requiring high luminance levels (e.g., computer displays, televisions, personal digital assistants (PDAs), mobile phones, etc.). Unfortunately, the illumination source used to illuminate a transmissive display usually consumes much more power than the display.

One solution to this problem is to make the display reflective or transflective. A reflective display (e.g., often found in digital watches or calculators) is illuminated by external light reflected by a diffusing reflector located behind the display. Although the absence of an illumination source reduces power consumption in a reflective display, the contrast on such displays is typically poorer than on transmissive displays. A transflective display works as either a transmissive display or a reflective display, depending on the ambient light. For example, a transflective display operates in a reflective mode when external light levels are high, and in a transmissive mode in darker environments via a backlight. Unfortunately, transflective displays are not as power efficient as transmissive displays in the transmissive mode, and are not as power efficient as reflective displays in the reflective mode. Therefore, what is needed is a method to make transflective displays more power efficient.

BRIEF SUMMARY

Embodiments of the invention are directed to systems, methods and computer program products for increasing the power efficiency of a display. In some embodiments, an exemplary method includes providing an illumination source with one or more distinct peaks in the illumination source's transmission spectrum; providing a transflective display that has a transmissive mode of operation and a reflective mode of operation; directing light from the illumination source towards the transflective display during the transmissive mode of operation; configuring, for the transmissive mode of operation, the transflective display's transmission spectrum to substantially match the illumination source's transmission spectrum such that one or more narrow passbands in the transflective display's transmission spectrum substantially overlap with the one or more distinct peaks in the illumination source's transmission spectrum; and enabling light from an ambient light source to illuminate the transflective display during a reflective mode of operation, wherein for the reflective mode of operation, the transflective display's reflection spectrum is substantially inversely related to the transflective display's transmission spectrum.

In some embodiments, the illumination source does not direct light towards the transflective display during the reflective mode. In some embodiments, the display is a liquid crystal display. In some embodiments, the illumination source comprises one or more nano-LEDs or one or more narrow spectrum light sources. In some embodiments, the illumination source comprises one or more nano-wires/tubes or one or more Quantum dots. In some embodiments, the illumination source comprises one or more lasers.

In some embodiments, the transmission spectrum of the illumination source can be modified such that the one or more distinct peaks in the illumination source's transmission spectrum can be shifted. In some embodiments, the directing step comprises directing, via one or more light tubes, light from the illumination source towards the transflective display during the transmissive mode of operation. In some embodiments, the one or more light tubes are positioned under the transflective display and wherein the one or more illumination source are positioned to the left or right side of the transflective display.

In some embodiments, the transflective display comprises a transflective layer that is either integrated into the transflective display or is a separate foil distinct from the transflective display. In some embodiments, the illumination source provides red light, green light, and blue light such that the one or more distinct peaks in the illumination source's transmission spectrum correspond to peaks associated with the red light, the green light, and the blue light.

In some embodiments, the transflective display includes a pixel array comprising one or more pixels, wherein each pixel comprises either no sub-pixels or comprises one or more sub-pixels associated with one or more colors. In some embodiments, the transflective display is a field-sequential display that switches between displaying images associated with different colors, wherein an image associated with a particular color is displayed during a predetermined time interval. In some embodiments, the illumination source switches between emitting light associated with different colors such that the illumination source emits light associated with the particular color during the predetermined time interval. In some embodiments, the transflective display does not reflect color during the reflective mode. In some embodiments, wherein the transflective display further comprises a color filter such that color is reflected during the reflective mode.

In some embodiments, the illumination source comprises a first group of mini-illumination sources that is activated and a second group of mini-illumination sources that is deactivated such that a first part of an image presented on the transflective display is darker compared to a second part of the image presented on the transflective display.

In some embodiments, the directing step comprises directing, via a diffusor, light from the illumination source towards the transflective display during the transmissive mode of operation, wherein the diffusor controls how the light from the illumination source is distributed onto the transflective display.

In some embodiments, a system is provided for increasing power efficiency of a transflective display. In some embodiments, the system comprises a transflective display that is operable in either a transmissive mode or a reflective mode; and an illumination source with one or more distinct peaks in the illumination source's transmission spectrum, wherein light from the illumination source is directed towards the transflective display during the transmissive mode of operation. For the transmissive mode of operation, the transflective display's transmission spectrum is configured to substantially match the illumination source's transmission spectrum such that one or more narrow passbands in the transflective display's transmission spectrum substantially overlap with the one or more distinct peaks in the illumination source's transmission spectrum. For the reflective mode of operation, the transflective display's reflection spectrum is substantially inversely related to the transflective display's transmission spectrum. Additionally, the system may be configured to perform the processes described the exemplary method above.

In some embodiments, a computer program product is provided for increasing power efficiency of a transflective display. In some embodiments, the computer program product comprises a non-transitory computer-readable medium comprising code configured to cause a computer to: configure properties of a transflective display, wherein the transflective display has a transmissive mode of operation and a reflective mode of operation; establish one or more distinct peaks for a transmission spectrum associated with an illumination source; initiate provision of light from the illumination source to the transflective display during the transmissive mode of operation; configure, for the transmissive mode of operation, the transflective display's transmission spectrum to substantially match the illumination source's transmission spectrum such that one or more narrow passbands in the transflective display's transmission spectrum substantially overlap with the one or more distinct peaks in the illumination source's transmission spectrum; and configure, for the reflective mode of operation, the transflective display's reflection spectrum such that the reflective spectrum is substantially inversely related to the transflective display's transmission spectrum. Additionally, the computer program product may be configured to perform the processes described the exemplary method above.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for increasing the power efficiency of a transflective display. As used herein, a transflective display comprises a transflector or a transflective layer. In some embodiments, this transflective layer is integrated into the display. In other embodiments, the transflective layer may be provided as a foil distinct from the display. In embodiments of the invention, the properties of the transflective layer are configured or optimized based at least partially on spectral properties of the illumination source that provides light to the display and/or the transflective layer. As explained previously, a transflective layer may have two modes of operation: a transmissive mode and a reflective mode.

As used herein, power efficiency in the transmissive mode is the ratio of the amount of power actually used to illuminate the transflective display in the transmissive mode to the amount of power provided by the illumination source. As used herein, power efficiency in the reflective mode is the ratio of the amount of power actually used to illuminate the transflective display in the reflective mode to the amount of power associated with the amount of ambient light power as determined by a light sensor associated with the transflective display.

In some conventional transflective displays, the transmissive mode is associated with a higher power efficiency when compared to the reflective mode. This is because the construction or configuration of the transflective display is such that the transmissive mode is given higher priority when compared to the reflective mode. This means that the transflective display is designed for increasing power efficiency associated with receiving emitted light from an illumination source and illuminating the transflective display using the emitted light from the illumination source. This also means that the transflective display is not designed for increasing power efficiency associated with receiving ambient light and illuminating the display using the received ambient light.

In other conventional transflective displays, the reflective mode is associated with a higher power efficiency when compared to the transmissive mode. This is because the construction or configuration of the transflective display is such that the reflective mode is given higher priority when compared to the transmissive mode. This means that the transflective display is not designed for increasing power efficiency associated with receiving emitted light from an illumination source and illuminating the transflective display using the emitted light. Instead, this means that the transflective display is designed for increasing power efficiency associated with receiving ambient light and illuminating the display using the received ambient light.

Therefore, for the purposes of increasing the power efficiency of a transflective display, there is an inherent conflict between the transmissive mode and the reflective mode. The present invention resolves this conflict by providing methods, systems, and computer program products to simultaneously increase power efficiency of a transflective display for both the transmissive mode and reflective mode.

As used herein, a device may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player; a printer; a facsimile machine; a pager; a calculator; a camera (e.g., digital or video); and/or any other device capable of utilizing a display.

Figure 1:
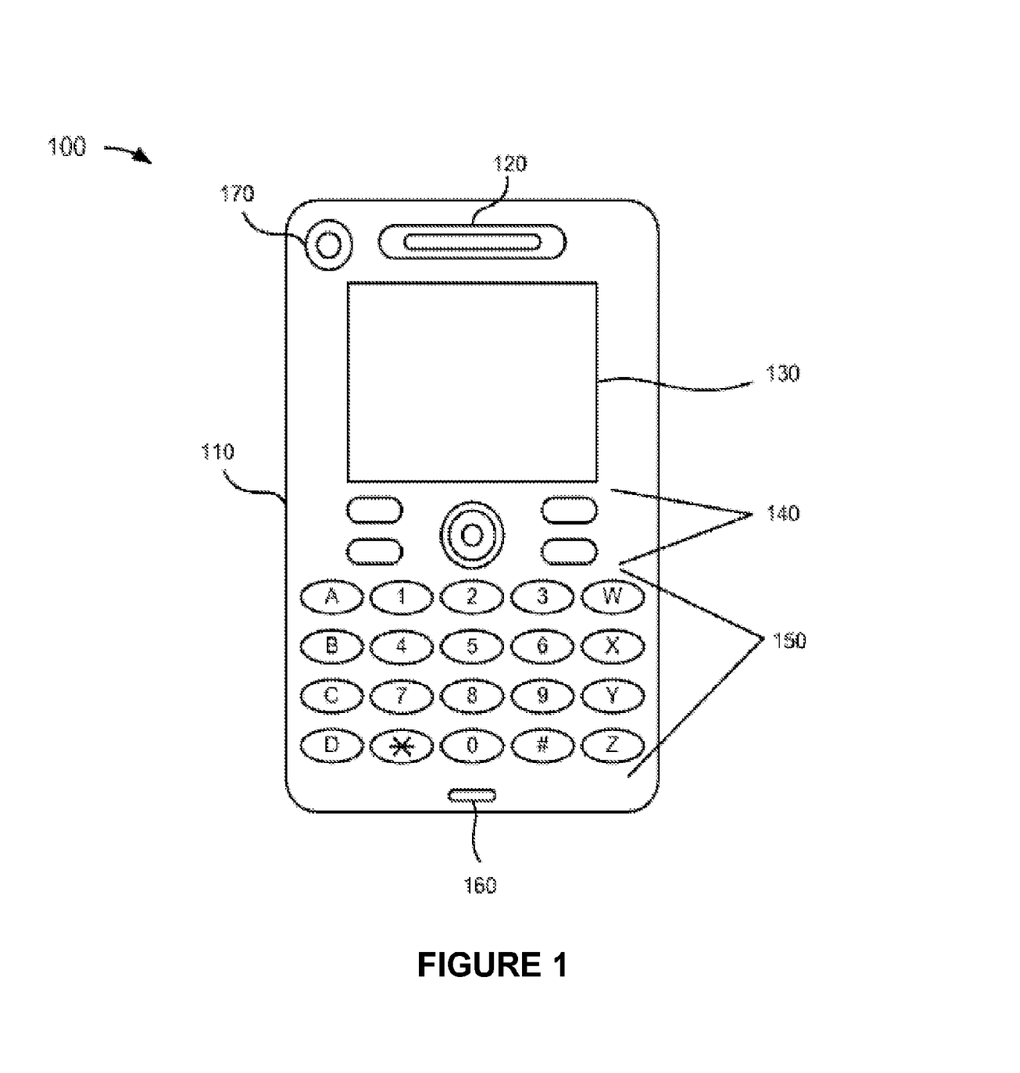
FIG. 1 is a block diagram illustrating an exemplary device that includes a display, in accordance with embodiments of the present invention.

FIG. 1 is a diagram of an exemplary device 100 according to an implementation of the present invention described herein. As shown in FIG. 1, device 100 may include a housing 110, a speaker 120, a display 130, control buttons 140, a keypad 150, a microphone 160, and/or a camera 170. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, emails, etc. Control buttons 140 may permit the user to interact with device 100 to cause device 100 to perform one or more operations. Keypad 150 may include a standard telephone keypad and/or/or may include additional keys to enable typing information into device 100. Microphone 160 may receive audible information from the user. Camera 170 may enable a user to capture and/or store video and/or images (e.g., pictures).

Embodiments of the invention are not limited methods, systems, and computer program products associated with mobile device displays. Embodiments of the invention are applicable to any display, e.g., a television display, a computer display, etc.

Figure 2:
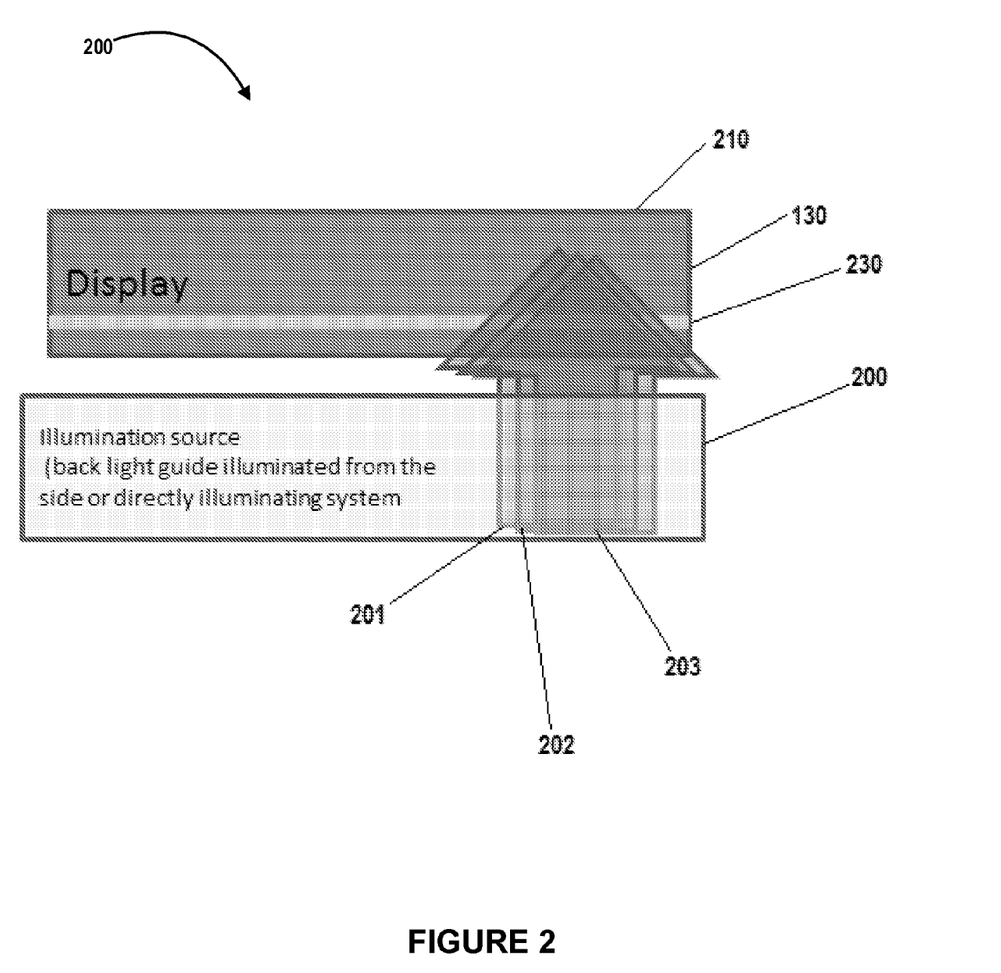
FIG. 2 is a block diagram illustrating a partial side elevation view, in partial cross section, of the display of the device of FIG. 1, in accordance with embodiments of the present invention.

FIG. 2 is a partial side elevation view, in partial cross section, of display 130. As shown in FIG. 2, display 130 may include an illumination source 200, a pixel array 210, a transflective layer 230, etc. In some embodiments, the transflective layer 230 may be comprised within the pixel array 210, while in other embodiments, the transflective layer 230 may be provided separately from the pixel array 210. Display 130 may include other components (e.g., electrical components, optical components, etc.) not shown in FIG. 2.

The illumination source 200 may include any device capable of providing illumination or lighting to display 130 and/or pixel array 210 and/or transflective layer 230. As used herein, an illumination source 200 may also be referred to as an illumination device, a backlight source, or a backlight device. For example, illumination source 200 may include an incandescent light bulb, one or more light-emitting diodes (LEDs), an electroluminescent panel (ELP), one or more cold cathode fluorescent lamps (CCFL), one or more hot cathode fluorescent lamps (HCFL), etc. An incandescent light bulb may be used when very high brightness is desired. LEDs may be used in small, inexpensive displays, and may include colored or white light. An ELP may be used for larger displays or when even lighting is desired, and may be either colored or white. CCFLs may be used on large displays (e.g., computer monitors) and may be white in color. In another example, illumination source 200 may employ a diffuser or light guide to provide even lighting from an uneven source. In still another example, illumination source 200 can include any color light source (e.g., yellow, green, blue, white, etc.) or any combination of colored/non-colored light sources.

In some embodiments, light may be directly provided from the illumination source 200 to the transflective layer 230. In such embodiments, the illumination source 200 may be positioned adjacent to and/or under the transflective layer 230. However, in other embodiments, a light guide may be provided to guide light from the illumination source 200 to the transflective layer 230. In such embodiments, the illumination source 200 need not be positioned adjacent to and/or under the transflective layer 230. In such embodiments, the illumination source 200 may be positioned to right or left side of the transflective layer 230 and a light guide may be used to direct light to the transflective layer 230. In such embodiments, the light guide may be positioned under (or behind) the transflective layer 230. The light guide may receive light from the illuminations source 200 that is positioned to the right or left side of the transflective layer 230, and may reflect the received light towards the transflective layer 230.

Pixel array 210 may include any device capable of providing visual information (e.g., text, images, video, incoming or outgoing calls, games, phone books, the current time, emails, etc.) to a user. For example, pixel array 210 may include a liquid crystal display (LCD), such as a thin film transistor (TFT) LCD display, or a high performance addressing (HPA) LCD display.

In one implementation of the present invention, pixel array 210 may include any number of color and/or monochrome pixels arrayed in front of a light source (e.g., illumination source 200). In another implementation, pixel array 210 may include electrodes on one side of pixel array 210 that may be grouped and wired together with gate or column lines, and each group may receive its own voltage source. Pixel array 210 may further include electrodes on another side of pixel array 210 that may be grouped and wired together with row lines, and each group may receive its own voltage sink. The groups may be designated so that each pixel of pixel array 210 may have a unique combination of source and sink.

In still another implementation of the present invention, pixel array 210 may include a passive-matrix structure or an active-matrix structure. In a passive-matrix structure, each row or column of pixel array 210 may include a single electrical circuit, and the pixels may be addressable one at a time by row and column addresses. Pixels may maintain their states between refreshes without the benefit of an electrical charge. In an active-matrix structure, a matrix of TFTs may be added to the polarizing and color filters, and each pixel may include its own dedicated TFT that allows each gate or column line to access one pixel. If a row line is activated, the gate lines may be connected to a row of pixels and a correct voltage may be driven onto all of the gate lines. The row line may be deactivated, and the next row line may be activated. All row lines may be activated in sequence during a refresh operation.

In a further implementation of the present invention, if pixel array 210 is a color array, each pixel may be divided into three cells, or subpixels, which may be colored red, green, and blue by additional filters (e.g., pigment filters, dye filters, metal oxide filters, etc.). Each subpixel may be controlled independently to yield thousands or millions of possible colors for each pixel. In other implementations, each pixel of pixel array 210 may include more or less than three subpixels of various colors other than red, green, and blue. In still other implementations, each pixel of pixel array 210 includes a single monochromatic subpixel. In embodiments of the invention, each pixel (and each subpixel associated with each pixel) of pixel array 210 can be configured or adapted to pass light of wavelengths transmitted from the illumination source 200.

In embodiments where the pixel array performs the function of the transflective layer, each pixel or subpixel may include a transmissive section and a reflective section that permits the pixel or subpixel to work as either a transmissive display or a reflective pixel, respectively. For example, the pixel or subpixel may work reflectively when illumination source 200 is de-energized or turned off, and may work transmissively when illumination source 200 is energized or turned on.

Figure 3:
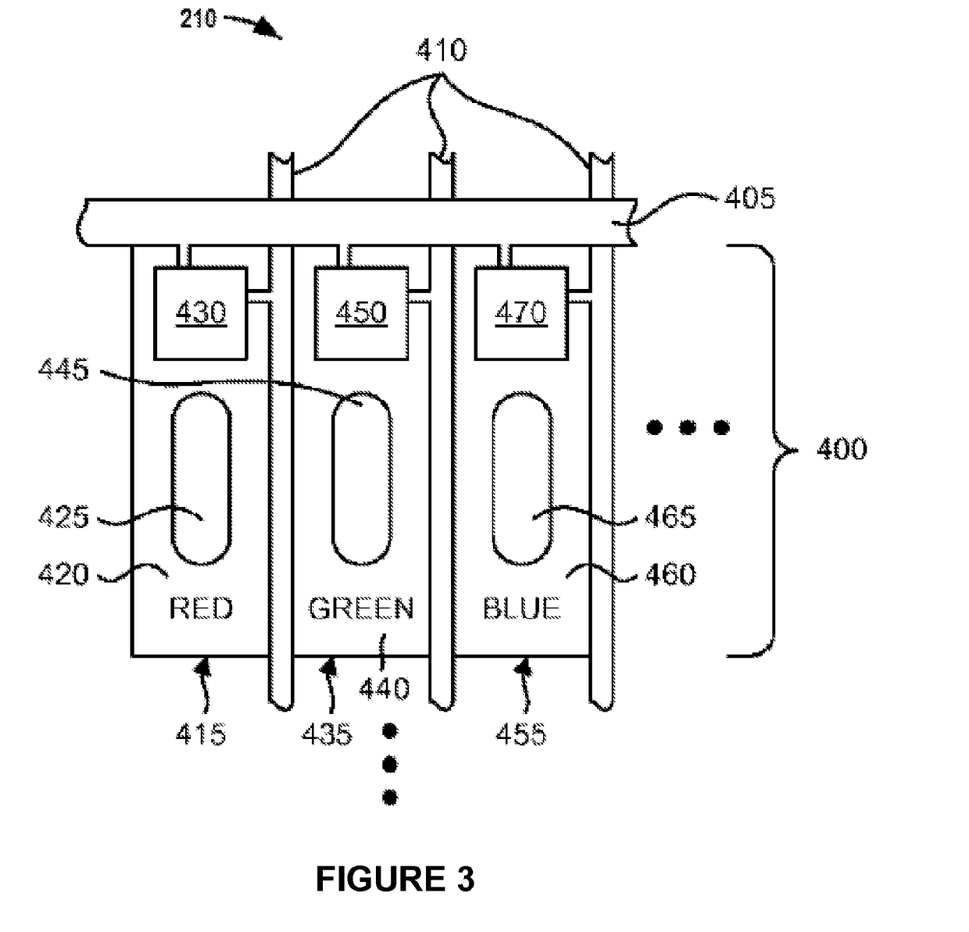
FIG. 3 is a block diagram illustrating a pixel of a pixel array illustrated in FIG. 2, in accordance with embodiments of the present invention.

FIG. 3 is a partial side elevation view of an exemplary pixel 400 of pixel array 210 of FIG. 2. Although FIG. 3 shows a color pixel 400, in other implementations, exemplary pixel 400 may include monochrome pixels. As shown, pixel 400 may include a red subpixel 415, a green subpixel 435, and a blue subpixel 455, which may be associated with a row line 405 and gate lines 410. As explained previously, in other embodiments, pixel 400 may include a single monochromatic subpixel.

As further shown in FIG. 3, red subpixel 415 may be associated with a reflective section 420, a transmissive section 425, and a TFT 430. Ambient light may be reflected by reflective section 420 in the standby mode. Reflective section 420 may use a color filter (e.g., red) to create color. Ambient light may pass through reflective section 420 and through the color filter, may be reflected by reflective section 420 (and pass through the color filter again), and may be viewed as red subpixel 415. Transmissive section 425 may include any material that may be illuminated from the back (e.g., with illumination source 200), and is viewed from the opposite side (i.e., the front). Transmissive section 425 may also use the color filter (e.g., red) to create color. Light from illumination source 200 may be transmitted through transmissive section 425 and the color filter, and may be viewed as red subpixel 415. TFT 430 may be electrically coupled to row line 405 and to a corresponding one of gate lines 410. TFT 430 may permit row line 405 and/or the corresponding one of gate lines 410 to access red subpixel 415.

Green subpixel 435 may be associated with a reflective section 440, a transmissive section 445, and a TFT 450. Ambient light may be reflected by reflective section 440 in the standby mode. Reflective section 440 may use a color filter (e.g., green) to create color. Ambient light may pass through reflective section 440 and through the color filter, may be reflected by reflective section 440 (and pass through the color filter again), and may be viewed as green subpixel 435. Transmissive section 445 may include any material that may be illuminated from the back (e.g., with illumination source 200), and is viewed from the opposite side (i.e., the front). Transmissive section 445 may also use the color filter (e.g., green) to create color. Light from illumination source 200 may be transmitted through transmissive section 445 and the color filter, and may be viewed as green subpixel 435. TFT 450 may be electrically coupled to row line 405 and to a corresponding one of gate lines 410. TFT 450 may permit row line 405 and/or the corresponding one of gate lines 410 to access green subpixel 435.

As further shown in FIG. 3, blue subpixel 455 may be associated with a reflective section 460, a transmissive section 465, and a TFT 470. Ambient light may be reflected by reflective section 460 in the standby mode. Reflective section 460 may use a color filter (e.g., blue) to create color. Ambient light may pass through reflective section 460 and through the color filter, may be reflected by reflective section 460 (and pass through the color filter again), and may be viewed as blue subpixel 455. Transmissive section 465 may include any material that may be illuminated from the back (e.g., with illumination source 200), and is viewed from the opposite side (i.e., the front). Transmissive section 465 may also use the color filter (e.g., blue) to create color. Light from illumination source 200 may be transmitted through transmissive section 465 and the color filter, and may be viewed as blue subpixel 455. TFT 470 may be electrically coupled to row line 405 and to a corresponding one of gate lines 410. TFT 470 may permit row line 405 and/or the corresponding one of gate lines 410 to access blue subpixel 455.

Figure 4:
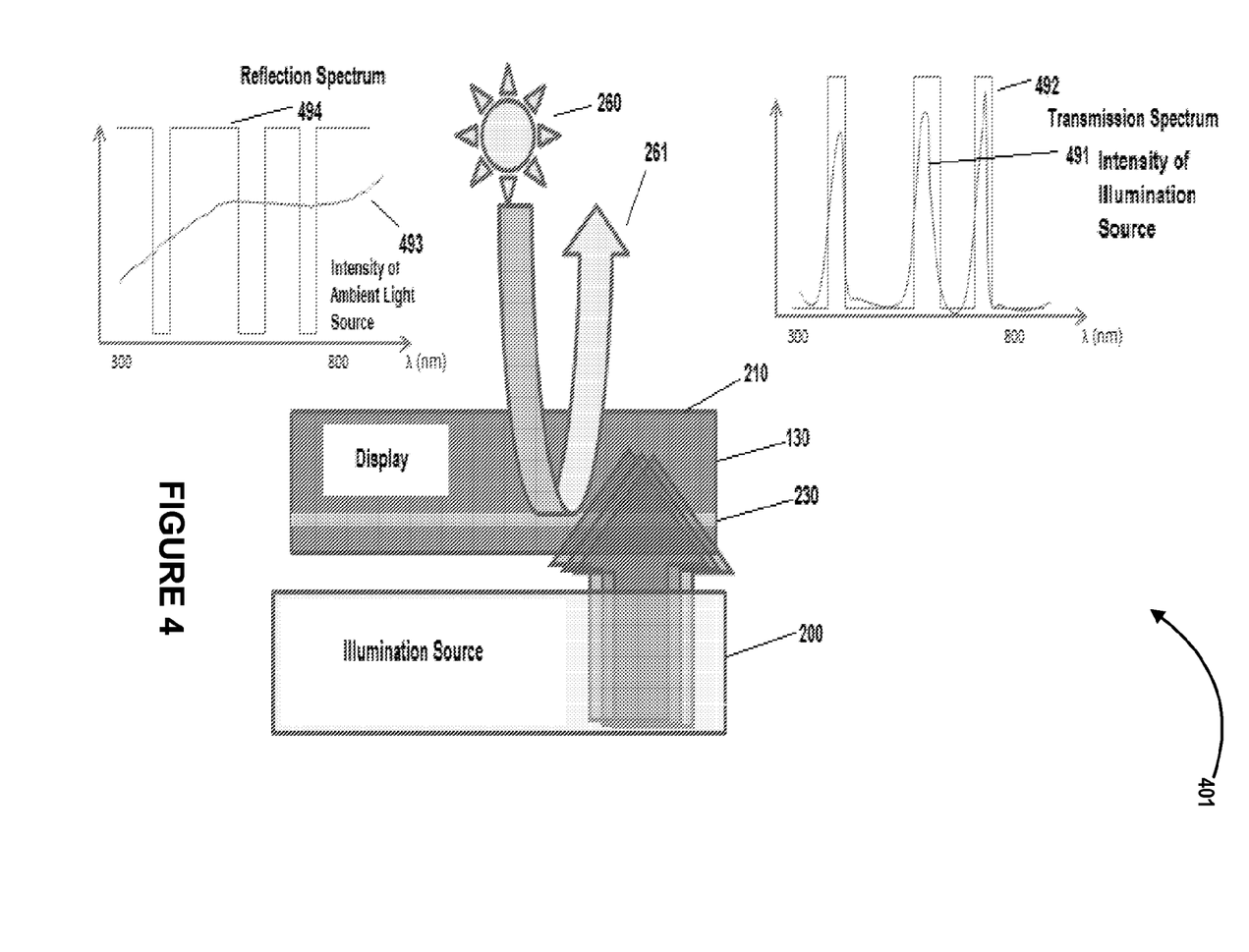
FIG. 4 is a block diagram illustrating an embodiment of a system environment for increasing the power efficiency of a display, in accordance with embodiments of the present invention.

Referring now to FIG. 4, an exemplary system environment 401 is provided for increasing the power efficiency of a display 130, in accordance with embodiments of the present invention. The pixel array 210 provided in the display 130 can be based on any of the previously described pixel array configurations, e.g., pixels with monochromatic subpixels, pixels with color subpixels (e.g., red, green, blue subpixels, etc.), pixels with no sub-pixels, etc. The transflective layer 230 has been described previously. The sun 260 is a representation of the ambient light source. Additionally, the display 130 includes a light sensor that is not shown in FIG. 4. The illumination source 200 has been described previously. In some embodiments, the illumination source 200 is part of the display 130, while in other embodiments, the illumination source 200 is separate from the display 130. As shown in FIG. 4, the illumination source 200 emits RGB (red, green, and blue) light. However, embodiments of the invention are not limited to any particular type (or wavelengths) of light emitted by the illumination source 200.

In some embodiments, the red light, the green light, and the blue light are emitted simultaneously by the illumination source 200. However, in other embodiments, each of the red light, the green light, and the blue light are emitted by the illumination source 200 during separate distinct time intervals. Therefore, in such embodiments, when the red light is emitted during a particular time interval, neither the green light nor the blue light is emitted during that particular time interval. Similarly, when the green light is emitted during a particular time interval, neither the red light nor the blue light is emitted during that particular time interval. Similarly, when the blue light is emitted during a particular time interval, neither the green light nor the red light is emitted during that particular time interval. In some embodiments, there might be an idle non-zero time interval between the emitting of each type of light.

Embodiments of the invention are directed to any illumination source for which one or more narrow bands of wavelengths of light can be selected for emission from the illumination source 200, i.e., a user may configure (e.g., via a user interface associated with the system) the illumination source 200 to emit light associated with one or more distinct narrow bands of wavelengths. For example, in some embodiments, the illumination source 200 may be configured to emit a light associated with a single distinct wavelength or a very narrow band of wavelengths. As explained further below, in some embodiments, in response to the user's configuration of the illumination source 200, the transmission spectrum of the transflective layer 230 of the display 130 may automatically configure itself such that the narrow passbands of the transmission spectrum of the transflective layer 230 automatically overlap with the newly configured peaks of the of illumination source's transmission spectrum.

The illumination source 200 is not limited to any specific technology. In some embodiments, the illumination source 200 may include one or more narrow spectrum light sources, such as one or more nano-LEDs. In some embodiments, the illumination source 200 may include one or more lasers. In some embodiments, the illumination source 200 uses nano-based technology. For example, the illumination source 200 may include one or more Quantum dots. As a further example, the illumination source 200 comprises one or more nano-wire LEDs which have a selectable dominant wavelength (e.g., selectable via a user interface associated with the system) and a stable transmission spectrum. As explained with the illumination source 200 described previously, the nano-wire LEDs may be placed behind or under the LCD display 130 (e.g., blue phase LCD display). In still other embodiments, the illumination source 200 may include a combination of the various types of illumination sources described herein.

In some embodiments, the illumination source 200 is a linear system, which means that the light is directly guided straight from the illumination source 200 to the display 130 (or the transflective layer 230). In other embodiments, the illumination source 200 may be a non-linear system, which means that the light is not guided straight from the illumination source 200 to the display 130, instead, the light may be guided to the display 130 via one or more light guides, which may be located under or behind the display 130.

Embodiments of the invention are directed to configuring the properties of the transflective layer 230 such that the transmission spectrum 492 of the transflective layer 230 substantially matches the actual spectrum 491 of the illumination source 200. As explained previously, in some embodiments, the transflective layer 230 may be part of the pixel array 210. In some embodiments, a user of the system may configure the properties (e.g., the transmission spectrum 492) of the transflective layer 230 via a user interface associated with the system. In some embodiments, a passband of the transmission spectrum 492 of the transflective layer 230 may be slightly broader than the width of a crest associated with light emitted from the illumination source 200. In other embodiments, a passband of the transmission spectrum 492 of the transflective layer 230 may be slightly narrower than the width of a crest associated with light emitted from the illumination source 200. The width of a crest may be the width at the bottom of the crest, the width in the middle of the crest, the width close to the top or at the top of the crest, etc.

This matching of the spectrums of the illumination source 200 and the transflective layer 230 enables increase in power efficiency during both the transmissive mode and the reflective mode for the transflective layer 230. The graph on the right side of FIG. 4 is the graph for the transmissive mode of the transflective layer 230. The x-axis of this graph represents the wavelengths of light. The y-axis of the graph in FIG. 4 and all other graphs described herein represents the intensity of light. As indicated by this graph, the transflective layer 230 is configured to allow light associated with red, green, and blue wavelengths to pass through the transflective layer 230. By allowing light associated with wavelengths of the illumination source 200 to pass through the transflective layer 230 during the transmissive mode, the transflective layer 230 enables more light emitted from the illumination source 200 to illuminate information presented on the display 130, thereby increasing the power efficiency during the transmissive mode. Additionally, by matching the spectrums of the illumination source 200 and the transflective layer 230, less light received from the illumination source 200 is blocked by the transflective layer 230.

The graph on the left side of FIG. 4 is the graph for the reflective mode of the transflective layer 230. As indicated by this graph, the transflective layer 230 is configured to block light associated with wavelengths of light emitted from the illumination source 200 (i.e., red, green, blue wavelengths). Also as indicated by this graph, in the reflective mode, the transflective layer 230 is configured 494 to pass light associated with wavelengths other than red, green, and blue wavelengths. By allowing light associated with wavelengths other than wavelengths of the illumination source 200 to be reflected 261 by the transflective layer 230 during the reflective mode, the transflective layer 230 enables more light 493 from the ambient light source 260 to illuminate information presented on the display 130, thereby increasing the power efficiency during the reflective mode. Additionally, by matching the spectrums of the illumination source 200 and the transflective layer 230, less light received from the ambient light source 260 is blocked by the transflective layer 230. In some embodiments, the spectrum 494 for the reflective mode may need to be separately configured, while in other embodiments, configuring the transmission spectrum 492 of the transflective layer 230 automatically results in the reflection spectrum 494 being configured for the reflective mode.

Therefore, when narrow band RBG (red green blue) light is used for the illumination source 200 and the transflective layer's transmission spectrum 492 is configured to allow the RGB light to pass through the transflective layer 230 during the transmissive mode, high levels of transmission and low levels of transmission loss, can be achieved during the transmissive mode. When the transflective layer's reflection spectrum 494 is configured allow light other than RGB light to pass through the transflective layer 230 during the reflective mode, high reflectance or reflectivity and low levels of reflection loss, can be achieved during the reflective mode. Therefore, the transflective layer 230 is transmissive only for the wavelengths emitted from the RGB LEDs, thereby achieving greater reflectivity without losing much transmissivity in the transmissive mode.

Figure 5:
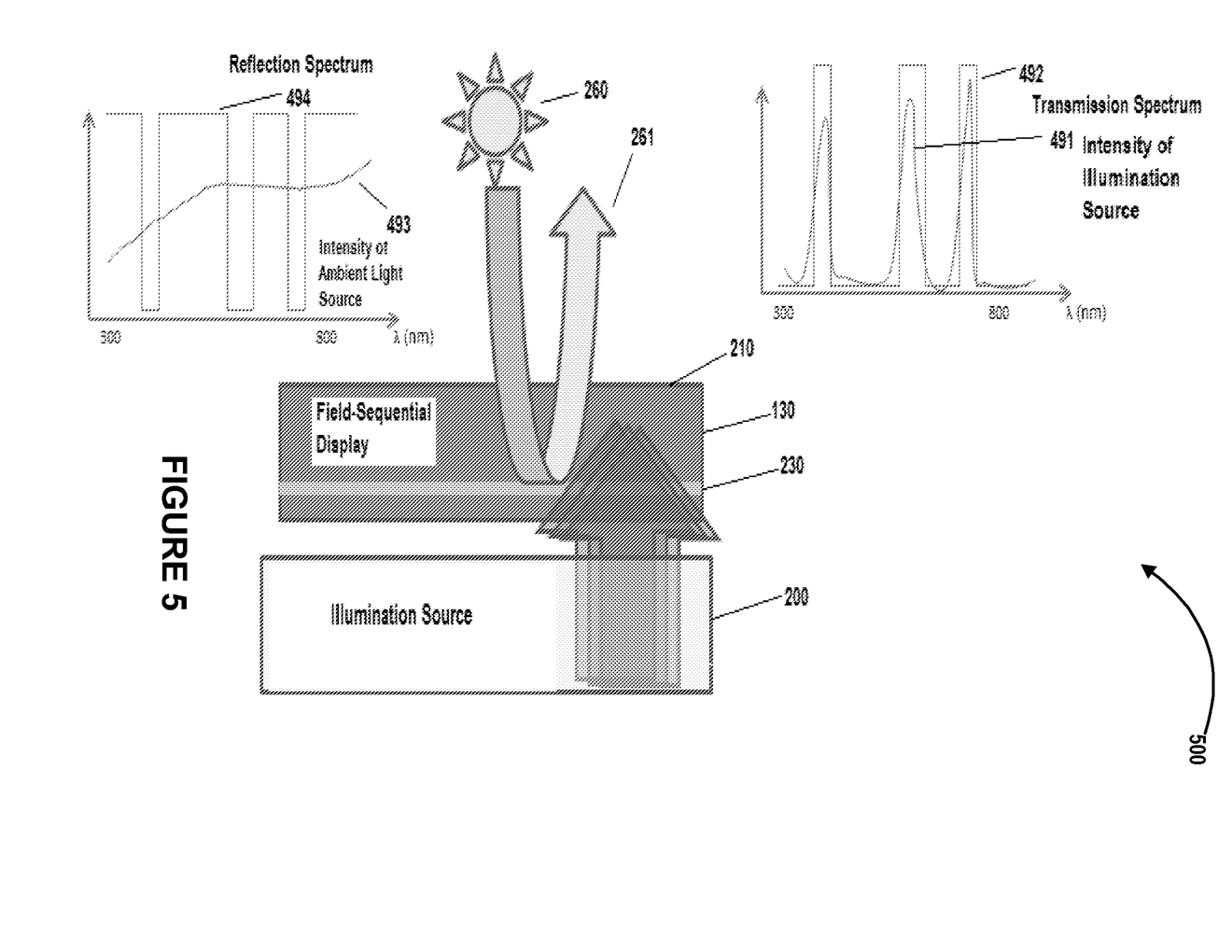
FIG. 5 is a block diagram illustrating another embodiment of a system environment for increasing the power efficiency of a display, in accordance with embodiments of the present invention.

Referring now to FIG. 5, another exemplary system environment 500 is provided for increasing the power efficiency of a display 130, in accordance with embodiments of the present invention. The above description with respect to FIG. 4 also applies to FIG. 5. In the embodiment presented in FIG. 5, the display 130 is a field-sequential display. As used herein, a field-sequential display is a system in which color images (e.g., primary color images) are transmitted as a continuous stream of successive images, such that a human eye (or other imaging system) combines the continuous stream of color images into a unified color image. Therefore, the display 130 in FIG. 5 is a fast-switching display that supports field sequential colors. The field sequential colors are not limited to the primary colors (red, green, blue) described herein and may refer to any other color in the visible spectrum (e.g., violet, indigo, yellow, orange, or a combination of any number of colors in the visible spectrum). As indicated in FIG. 5, in one embodiment, RGB light from the illumination source 200 switches in phase with the field sequential display 130. Therefore, for example, when red light is emitted by the illumination source 200 during a particular time interval, the transflective layer 230 associated with the display 130 is configured to match its transmission spectrum 492 to the red light emitted by the illumination source 200 such that the transmissivity of red light through the transflective layer 230 is high. Similarly, the transmission spectrum 492 of the transflective layer 230 is configured to substantially block all wavelengths of light that are not red light during the same particular time interval. Therefore, when the illumination source 200 switches from emitting red light to emitting blue light, a transflective layer 230 also switches from a transmission spectrum 492 that passes red light to a transmission spectrum 492 that passes blue light. In some embodiments, a user of the system may configure or control the switching intervals for each of the colors of light emitted from the illumination source 200. For example, a user may configure the system via a user interface of the system such that each color of light (e.g., red, green, and blue) are associated with equal emission time intervals. As a further example, a user may configure the system such that one color of light has a greater emission time interval compared to another color of light.

For the display 130 presented in FIG. 5, each pixel of the pixel array 210 does not need to include a red subpixel, a green subpixel, and a blue subpixel, and instead may just include one or more monochromatic subpixels. When each pixel does not include RGB subpixels and includes only one or more monochromatic subpixels or when each pixel does not include sub-pixels, at all, the display 130 cannot reflect color in the reflective mode. In alternate embodiments, each pixel of the pixel array 210 may include one or more subpixels, where each subpixel is associated with a different color (e.g., red subpixel, green subpixel, blue subpixel). In the embodiment presented in FIG. 5, the illumination source 200 may use nano-based technology as described previously in order to increase power efficiency in both the transmissive and reflective modes.

Figure 6:
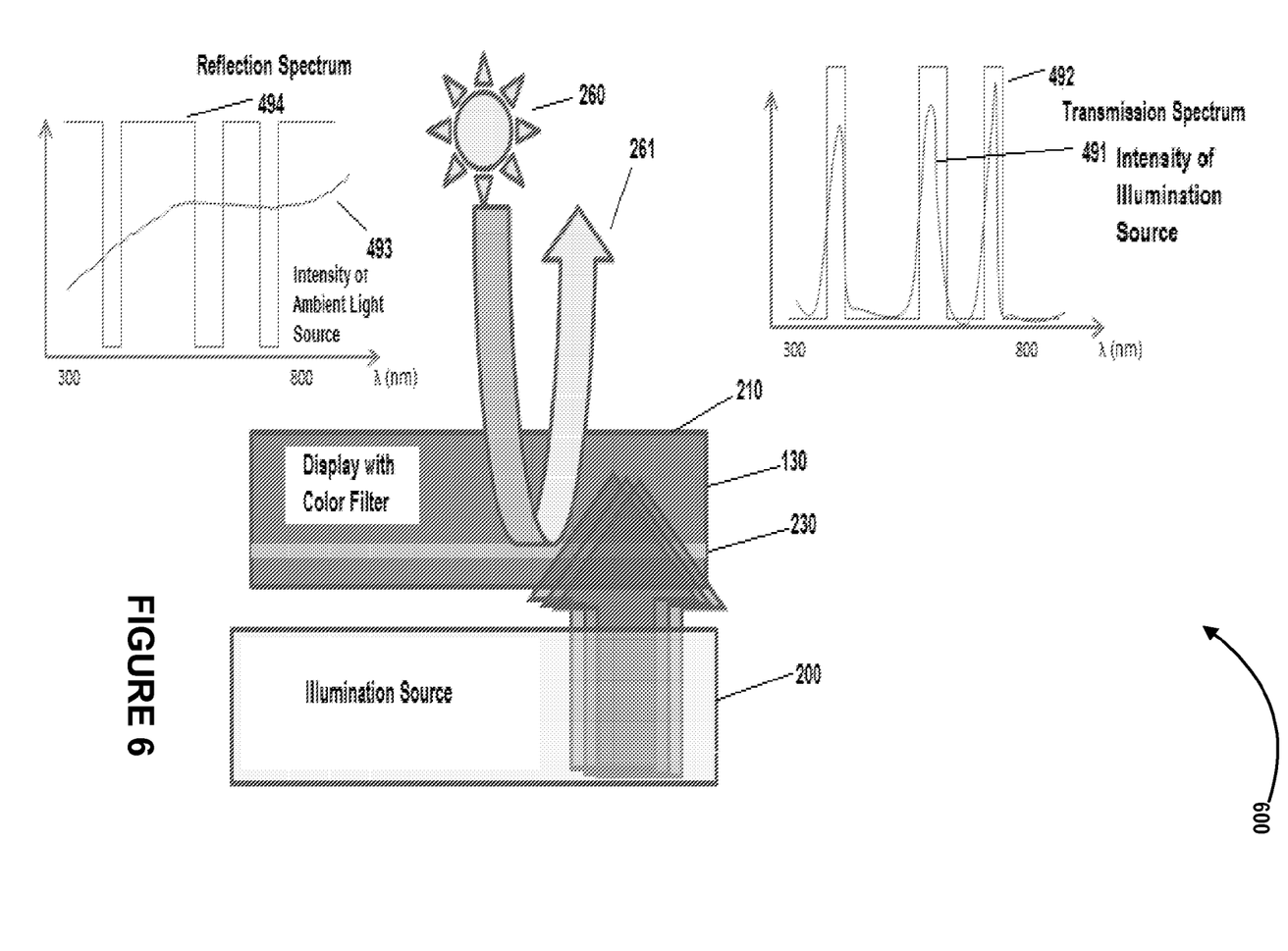
FIG. 6 is a block diagram illustrating another embodiment of a system environment for increasing the power efficiency of a display, in accordance with embodiments of the present invention.

Referring now to FIG. 6, another exemplary system environment 600 is provided for increasing the power efficiency of a display 130, in accordance with embodiments of the present invention. The above description with respect to FIG. 4 also applies to FIG. 6. Additionally, the above description with respect to FIG. 5 may apply to FIG. 6. In some embodiments, the display 130 presented in FIG. 6 is a field-sequential display, while in other embodiments, the display 130 presented in FIG. 6 is not a field-sequential display. The configuration of the system presented in FIG. 6 may not affect color presented in the transmissive mode. In the embodiment presented in FIG. 6, the display 130 uses a color filter to achieve color in the reflective mode. The color filter may be a separate foil that is used along with the display 130, or the color filter may be integrated into the display 130. In some embodiments, the color filter may be configured such only particular colors (e.g., red and blue) are displayed in the reflective mode. In some embodiments, a user of the system may customize properties (e.g., wavelengths of light that passes through the color filter, wavelengths of light that are blocked by the color filter, etc.) of the color filter using an interface associated with the system. In some embodiments of the system presented in FIG. 5, the illumination source 200 is not configured to continuously switch or scan red light, green light, and blue light. In other embodiments of the system presented in FIG. 5, the illumination source 200 may be configured to continuously switch or can red light, green light, and blue light, similar to the embodiment presented in FIG. 5. As with FIG. 5, pixels comprised within the pixel array 210 located in the display 130 may comprise one or more monochromatic subpixels, or may comprise one or more subpixels, where each subpixel is associated with a different color (e.g., red subpixel, green subpixel, blue subpixel).

Additionally, as with the embodiments in FIGS. 4 and 5, high transmissivity is achieved in the transmissive mode, and high reflectance is achieved in the reflective mode. In some embodiments a light sensor associated with the display 130 is configured to measure the ambient light. A processor associated with the system is then configured to compare the measured ambient light with a predetermined threshold amount. In some embodiments, the display 130 is configured to display color in the reflective mode when the ambient light is greater than or equal to a predetermined threshold amount, and is not configured to display color in the reflective mode when the ambient light is not greater than a predetermined threshold amount. In some embodiments, a user may be able to modify this predetermined threshold amount via a user interface associated with the system.

Figure 7:
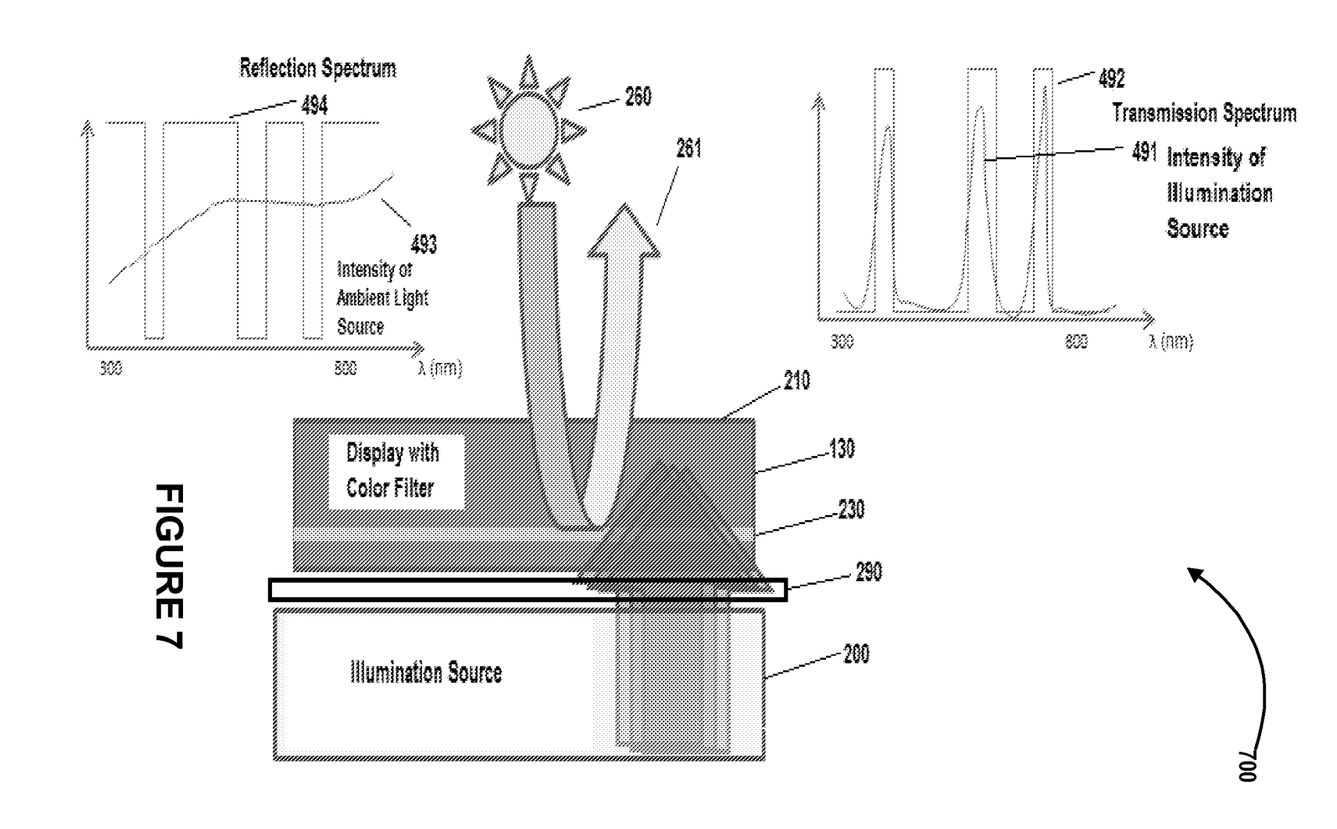
FIG. 7 is a block diagram illustrating another embodiment of a system environment for increasing the power efficiency of a display, in accordance with embodiments of the present invention.

Referring now to FIG. 7, another exemplary system environment 700 is provided for increasing the power efficiency of a display 130, in accordance with embodiments of the present invention. The above description with respect to FIG. 4 also applies to FIG. 7. Additionally, the above description with respect to FIGS. 5 and 6 may apply to FIG. 7. In the embodiment presented in FIG. 7, local dimming is combined with a transflective layer 230 as described in FIGS. 4, 5, and 6. The illumination source 200 presented in FIG. 7 may comprise a large number of smaller illumination sources (may be based on nano technology as described earlier) placed adjacent to the display 130. In some embodiments, each of these illumination sources can work independently from the other illumination sources. In other embodiments, each illumination source is part of a group of illumination sources that works independently from other groups of illumination sources, while illumination sources in each group work together (i.e., they are activated and deactivated together). In some embodiments, these illumination sources may be placed under the display 130. In other embodiments, these illumination sources need not be placed under the display 130 (e.g., the illumination sources may be placed to the right or left side of a display), and one or more light guides, which may be placed under or behind the display 130, may be used to direct light from the illumination source 200 towards the display 130. In still other embodiments, one group of illumination sources may be placed under the display 130, while other groups of illumination sources may be placed on the left or right side of the display 130.

Using a large number of illumination sources enables local dimming or area dimming because some of the illumination sources that direct light to a particular area of the display 130 may be activated while other illumination sources that direct light to a different area of the display 130 may be deactivated. This allows selective dimming of the display 130 which enables power conservation and increase in contrast ratios. Therefore, using the configuration of the system in FIG. 7, a part of the image presented on the display 130 may be dark, while another part of the image presented on the display 130 may be bright. In some embodiments, the amount of dimming associated with an illumination source 200 may be controlled as well. Therefore, a user may control or configure (e.g., via a user interface associated with the system) the number of illumination sources that are activated and/or deactivated and which illumination sources are activated and/or deactivated. In this way, a user may configure which area of the display 130 is bright and which area of the display 130 is dark. Additionally, the user may configure the intensity of brightness (or darkness) associated with bright (or dark) areas by controlling the number of illumination sources that are activated (or deactivated) or by controlling the diffusor's properties (as described below)

In some embodiments, power efficiency in both the transmissive and reflective modes may be obtained when the illumination sources are nano-wire LEDs (e.g., with configurable or customizable transmission spectrums) as described previously. In some embodiments, a user of the system may configure how each of the illumination sources is activated or deactivated as a function of time using a user interface associated with the system.

FIG. 7 also presents a diffusor (or a diffusing optics system) that is positioned adjacent to the display 130. In the embodiment presented in FIG. 7, the diffusor is positioned under the display 130 and is positioned over or on top of the illumination source 200, which as described previously may comprise numerous smaller illumination sources. Light from the illumination source 200 (or from light tubes that receive light from the illumination source 200) reaches the transflective layer via the diffusor. In some embodiments, the diffusor is separate from the display 130 and separate from the illumination source 200, which comprises a plurality of smaller illumination sources as described previously. In other embodiments, the diffusor may be integrated either into the display 130 or into the illumination source 200. The diffusor reduces hotspots or uneven light distribution by controlling the distribution of light from the illumination sources on to the display 130 or on to the transflective layer 230 of the display 130. In some embodiments, a user of the system may configure properties (e.g., how light received from the illumination sources is distributed to the display 130) of the diffusor via a user interface associated with the system. The properties may not only include how the light from the illumination sources is spread or distributed onto the display 130 (some areas may receive more light than others), but also how the light from the illumination sources is distributed or spread onto the display 130 as a function of time.

LED technologies, such as Quantum dots and nanotubes, are well suited to support both local dimming as described herein with respect to FIG. 7 and a transflective layer 230 as described in FIGS. 4, 5, 6, and 7. Therefore, embodiments of the invention are directed to combining nano-technology based LEDs (e.g., chromatic LEDs such as RGB LEDs or LEDs associated with any other color or combination of colors) with an illumination source with local dimming, and configuring or adapting a transflective layer of an LCD display (which may even be a fast-switching LCD display) based on the spectrum of the LEDs in order to obtain a power efficient LCD display.

In some embodiments, a user interface as described herein may be presented on the display presented in the Figures. In other embodiments, a user interface as described herein may be presented on a separate display different from the display presented in the Figures.

Figure 8:
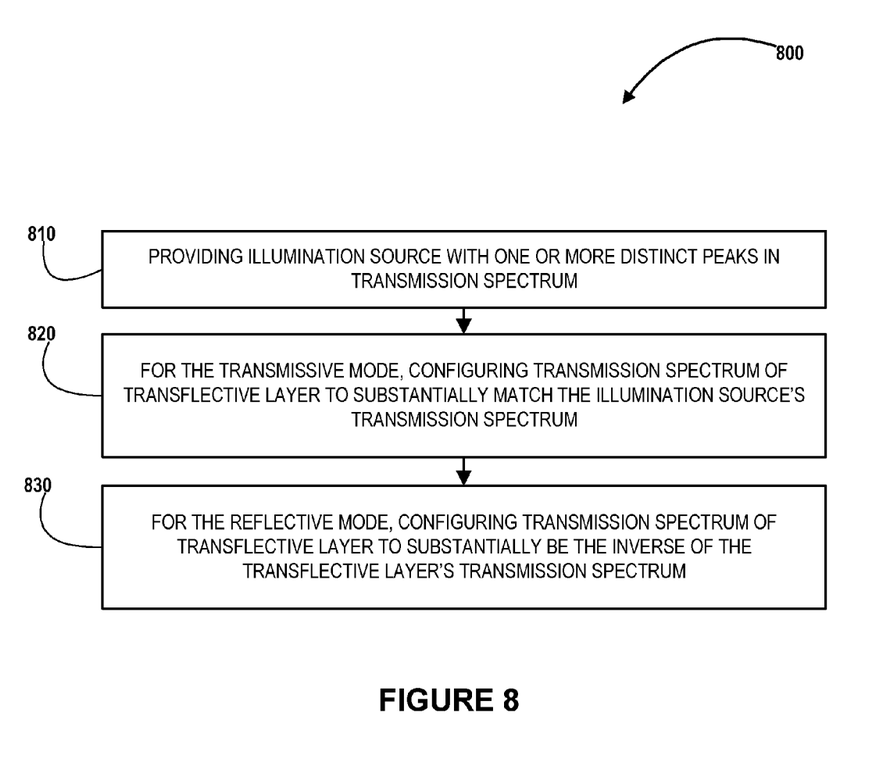
FIG. 8 is a flowchart illustrating a general process flow for increasing the power efficiency of a display, in accordance with embodiments of the present invention.

Referring now to FIG. 8, a general process flow 800 is provided for increasing the power efficiency of a display, in accordance with embodiments of the present invention. At block 810, an illumination source is provided with one or more distinct peaks in the transmission spectrum (e.g., peaks for red, green, and blue light). In some embodiments, a user of the system may be allowed to configure the transmission spectrum of the illumination source by selecting one or more peaks. At block 820, the transmission spectrum of a transflective layer associated with a display is configured to substantially match the illumination source's transmission spectrum for the transmissive mode of the transflective layer. In some embodiments, a user may be allowed to configure the transmission spectrum of the transflective layer for the transmissive mode. By allowing light associated with wavelengths of the illumination source to pass through the transflective layer during the transmissive mode, the transflective layer enables more light emitted from the illumination source to illuminate information presented on the display, thereby increasing the power efficiency during the transmissive mode.

At block 830, for the reflective mode, the transmission spectrum of a transflective layer associated with a display is configured to substantially be the inverse of the transflective layer's transmission spectrum for the transmissive mode. In some embodiments, a user may be allowed to configure the transmission spectrum of the transflective layer for the reflective mode. In alternate embodiments, for the reflective mode, the transmission spectrum of the transflective layer is inversely related to or is configured to substantially be the inverse of the illumination source's transmission spectrum. By allowing light associated with wavelengths other than wavelengths of the illumination source to be reflected by the transflective layer during the reflective mode, the transflective layer enables more light from the ambient light source to illuminate information presented on the display, thereby increasing the power efficiency during the reflective mode. In some embodiments, when the transflective layer changes from the transmissive mode to the reflective mode (e.g., when ambient light intensity falls below a predetermined threshold), the transflective layer changes from using the transmission spectrum to using the reflection spectrum in order to filter ambient light.

In some embodiments, a transflective layer switches from the reflective mode to the transmissive mode (or maintains the transmissive mode) when a processor associated with the display receives an ambient light level measured by a light sensor associated with the display, compares the ambient light level with a predetermined threshold, and determines that the ambient light level is less than the predetermined threshold. In such embodiments, when the transmissive mode is initiated, the illumination source is activated and directs light towards the transflective layer resulting in the display being illuminated by light received from the illumination source.

In some embodiments, a transflective layer switches from the transmissive mode to the reflective mode (or maintains the reflective mode) when a processor associated with the display receives an ambient light level measured by a light sensor associated with the display, compares the ambient light level with a predetermined threshold, and determines that the ambient light level is greater than or equal to the predetermined threshold. In such embodiments, when the reflective mode is initiated, the illumination source is deactivated and the display is illuminated only with light received from the ambient light source.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for increasing power efficiency of a transflective display, the method comprising:
   providing an illumination source with at least one distinct peak in the illumination source's transmission spectrum;
   providing a transflective display that has a transmissive mode of operation and a reflective mode of operation;
   receiving user configuration of the illumination source, wherein the user configuration results in directing light from the illumination source towards the transflective display during the transmissive mode of operation;
   in response to the user configuration of the illumination source, automatically configuring, by a computer processor, for the transmissive mode of operation, the transflective display's transmission spectrum to substantially match the illumination source's transmission spectrum such that at least one narrow passband in the transflective display's transmission spectrum substantially overlaps with the at least one distinct peak in the illumination source's transmission spectrum; and
   enabling light from an ambient light source to illuminate the transflective display during a reflective mode of operation, wherein for the reflective mode of operation, the transflective display's reflection spectrum is substantially inversely related to the transflective display's transmission spectrum.

2. The method of claim 1, wherein the illumination source does not direct light towards the transflective display during the reflective mode.

3. The method of claim 1, wherein the display is a liquid crystal display.

4. The method of claim 1, wherein the illumination source comprises at least one nano-LED or at least one other narrow spectrum light source.

5. The method of claim 1, wherein the illumination source comprises at least one nano-wires/tube or at least one Quantum dot.

6. The method of claim 1, wherein the illumination source comprises at least one laser.

7. The method of claim 1, wherein receiving the user configuration of the illumination source further comprises receiving the user configuration of the illumination source that modifies the transmission spectrum of the illumination source such that the at least one distinct peak in the illumination source's transmission spectrum is shifted.

8. The method of claim 1, wherein receiving the user configuration further comprises:
receiving the user configuration of the illumination source, wherein the user configuration results in directing, via at least one light tube, light from the illumination source towards the transflective display during the transmissive mode of operation.

9. The method of claim 8, wherein the at least one light tube is positioned under the transflective display and wherein the illumination source is positioned to the left or right side of the transflective display.

10. The method of claim 1, wherein the transflective display comprises a transflective layer that is either integrated into the transflective display or is a separate foil distinct from the transflective display.

11. The method of claim 1, wherein the illumination source provides red light, green light, and blue light such that the at least one distinct peak in the illumination source's transmission spectrum corresponds to peaks associated with the red light, the green light, and the blue light.

12. The method of claim 1, wherein the transflective display includes a pixel array comprising at least one pixel, wherein each pixel comprises either no sub-pixels or comprises at least one sub-pixel associated with at least one color.

13. The method of claim 1, wherein the transflective display is a field-sequential display that switches between displaying images associated with different colors, wherein an image associated with a particular color is displayed during a predetermined time interval.

14. The method claim 13, wherein the illumination source switches between emitting light associated with different colors such that the illumination source emits light associated with the particular color during the predetermined time interval.

15. The method of claim 1, wherein the transflective display does not reflect color during the reflective mode.

16. The method claim 1, wherein the transflective display further comprises a color filter such that color is reflected during the reflective mode.

17. The method of claim 1, wherein the illumination source comprises a first group of mini-illumination sources that is activated and a second group of mini-illumination sources that is deactivated such that a first part of an image presented on the transflective display is darker compared to a second part of the image presented on the transflective display.

18. The method of claim 1, wherein receiving the user configuration further comprises:
receiving the user configuration of the illumination source, wherein the user configuration results in directing, via a diffusor, light from the illumination source towards the transflective display during the transmissive mode of operation, wherein the diffusor controls how the light from the illumination source is distributed onto the transflective display.

19. A system for increasing power efficiency of a transflective display, the system comprising:
a transflective display that is operable in either a transmissive mode or a reflective mode; and
an illumination source with at least one distinct peak in the illumination source's transmission spectrum, wherein the system is configured to provide for user configuration of the illumination source, such that the user configuration results in directing light from the illumination source towards the transflective display during the transmissive mode of operation,
wherein, in response to the user configuration of the illumination source, for the transmissive mode of operation, the transflective display's transmission spectrum is automatically configured to substantially match the illumination source's transmission spectrum such that at least one narrow passband in the transflective display's transmission spectrum substantially overlaps with the at least one distinct peak in the illumination source's transmission spectrum, and
wherein, for the reflective mode of operation, the transflective display's reflection spectrum is substantially inversely related to the transflective display's transmission spectrum.

20. A computer program product for increasing power efficiency of a transflective display, the computer program product comprising:
a non-transitory computer-readable medium comprising code configured to cause a computer to:
receive user configurations that (1) configure properties of a transflective display, wherein the transflective display has a transmissive mode of operation and a reflective mode of operation and (2) establish at least one distinct peak for a transmission spectrum associated with an illumination source;
initiate provision of light from the illumination source to the transflective display during the transmissive mode of operation;
in response to receiving the user configurations automatically configure, for the transmissive mode of operation, the transflective display's transmission spectrum to substantially match the illumination source's transmission spectrum such that at least one narrow passband in the transflective display's transmission spectrum substantially overlaps with the at least one distinct peak in the illumination source's transmission spectrum; and
configure, for the reflective mode of operation, the transflective display's reflection spectrum such that the reflective spectrum is substantially inversely related to the transflective display's transmission spectrum.

* * * * *